(12) United States Patent
Kachmar

(10) Patent No.: US 8,363,994 B2
(45) Date of Patent: Jan. 29, 2013

(54) FIBER OPTIC CABLE ASSEMBLY

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 13/038,996

(22) Filed: Mar. 2, 2011

(65) Prior Publication Data

US 2011/0217010 A1   Sep. 8, 2011

Related U.S. Application Data

(60) Provisional application No. 61/394,218, filed on Oct. 18, 2010, provisional application No. 61/309,676, filed on Mar. 2, 2010.

(51) Int. Cl.
*G02B 6/44* (2006.01)
(52) U.S. Cl. ........ 385/111; 385/100; 385/101; 385/102; 385/103; 385/104; 385/105; 385/106; 385/107; 385/108; 385/109; 385/110
(58) Field of Classification Search ........... 385/100–114
See application file for complete search history.

(56) References Cited

U.S. PATENT DOCUMENTS

| | | | |
|---|---|---|---|
| 3,991,014 A | 11/1976 | Kleinschuster | |
| 4,067,852 A | 1/1978 | Calundann | |
| 4,083,829 A | 4/1978 | Calundann et al. | |
| 4,130,545 A | 12/1978 | Calundann | |
| 4,161,470 A | 7/1979 | Calundann | |
| 4,318,842 A | 3/1982 | East et al. | |
| 4,456,331 A | 6/1984 | Whitehead et al. | |
| 4,468,364 A | 8/1984 | Ide | |
| 5,442,722 A | 8/1995 | DeCarlo | |
| 5,651,081 A * | 7/1997 | Blew et al. | 385/101 |
| 5,717,805 A | 2/1998 | Stulpin | |
| 5,970,196 A | 10/1999 | Greveling et al. | |
| 6,088,499 A | 7/2000 | Newton et al. | |
| 6,137,936 A * | 10/2000 | Fitz et al. | 385/113 |
| 6,167,180 A * | 12/2000 | Keller | 385/113 |
| 6,542,674 B1 | 4/2003 | Gimblet | |
| 6,813,421 B2 | 11/2004 | Lail et al. | |
| 7,197,215 B2 * | 3/2007 | Baird et al. | 385/113 |
| 7,218,821 B2 * | 5/2007 | Bocanegra et al. | 385/103 |
| 7,346,244 B2 * | 3/2008 | Gowan et al. | 385/113 |
| 7,379,642 B2 | 5/2008 | Kachmar | |
| 7,391,943 B2 | 6/2008 | Blazer et al. | |
| 7,466,890 B2 | 12/2008 | Kachmar | |

(Continued)

FOREIGN PATENT DOCUMENTS

| JP | 60-91306 | 5/1985 |
|---|---|---|
| KR | 10-2006-0081266 | 7/2006 |

(Continued)

OTHER PUBLICATIONS

International Search Report and Written Opinion mailed Nov. 25, 2011.

*Primary Examiner* — Brian M. Healy
*Assistant Examiner* — Guy Anderson
(74) *Attorney, Agent, or Firm* — Merchant & Gould P.C.

(57) ABSTRACT

A fiber optic cable assembly includes an outer jacket defining a first passage and a second passage disposed adjacent to the first passage. The outer jacket includes a wall disposed between an outer surface of the outer jacket and the first passage. A plurality of optical fibers is disposed in the first passage. A reinforcing member is disposed in the second passage. An access member is disposed in the wall of the outer jacket.

20 Claims, 8 Drawing Sheets

U.S. PATENT DOCUMENTS

| | | | |
|---|---|---|---|
| 7,490,994 B2 | 2/2009 | Scadden et al. | |
| 7,530,746 B2 | 5/2009 | Kachmar | |
| 7,534,050 B2 | 5/2009 | Kachmar | |
| 7,587,111 B2 | 9/2009 | De Montmorillon et al. | |
| 7,590,321 B2 * | 9/2009 | Lu et al. | 385/104 |
| 7,623,747 B2 | 11/2009 | De Montmorillon et al. | |
| 7,630,066 B2 | 12/2009 | Kachmar | |
| 7,676,134 B2 | 3/2010 | Kachmar | |
| 7,693,375 B2 * | 4/2010 | Freeland et al. | 385/100 |
| 7,811,156 B2 | 10/2010 | Kachmar | |
| 7,817,891 B2 * | 10/2010 | Lavenne et al. | 385/109 |
| 7,869,678 B2 | 1/2011 | Kachmar | |
| 7,873,249 B2 | 1/2011 | Kachmar et al. | |
| 8,041,166 B2 | 10/2011 | Kachmar | |
| 8,083,416 B2 | 12/2011 | Scadden et al. | |
| 8,090,232 B2 | 1/2012 | Kachmar | |
| 8,107,781 B2 | 1/2012 | Kachmar et al. | |
| 8,184,935 B2 | 5/2012 | Kachmar | |
| 8,224,141 B2 | 7/2012 | Kachmar et al. | |
| 2006/0127016 A1 * | 6/2006 | Baird et al. | 385/113 |
| 2006/0291787 A1 * | 12/2006 | Seddon | 385/109 |
| 2007/0182054 A1 | 8/2007 | Kachmar | |
| 2008/0013899 A1 * | 1/2008 | Gowan et al. | 385/113 |
| 2009/0087148 A1 * | 4/2009 | Bradley et al. | 385/76 |
| 2009/0274425 A1 | 11/2009 | Caldwell et al. | |
| 2009/0294016 A1 | 12/2009 | Sayres et al. | |
| 2009/0297102 A1 | 12/2009 | Kachmar | |
| 2009/0297104 A1 | 12/2009 | Kachmar | |
| 2009/0317038 A1 | 12/2009 | Kachmar | |
| 2010/0119197 A1 | 5/2010 | Scadden et al. | |
| 2011/0019963 A1 | 1/2011 | Skluzacek et al. | |
| 2011/0091170 A1 | 4/2011 | Bran de León et al. | |
| 2011/0150398 A1 | 6/2011 | Zimmel et al. | |
| 2011/0217010 A1 | 9/2011 | Kachmar | |
| 2011/0222825 A1 | 9/2011 | Kachmar | |
| 2011/0280521 A1 | 11/2011 | Kachmar | |
| 2011/0286707 A1 | 11/2011 | Kachmar | |
| 2011/0311185 A1 | 12/2011 | Kachmar et al. | |
| 2012/0128309 A1 | 5/2012 | Kachmar et al. | |

FOREIGN PATENT DOCUMENTS

| | | |
|---|---|---|
| KR | 10-2006-0107414 | 10/2006 |

* cited by examiner

FIBER OPTIC CABLE ASSEMBLY

CROSS-REFERENCE TO RELATED APPLICATIONS

The current application claims the benefit of U.S. Provisional Patent Application Ser. No. 61/394,218, filed Oct. 18, 2010 and also claims the benefit of U.S. Provisional Patent Application Ser. No. 61/309,676, filed Mar. 2, 2010, which applications are hereby incorporated by reference in their entireties.

BACKGROUND

A fiber optic cable typically includes: (1) an optical fiber; (2) a buffer layer that surrounds the optical fiber; (3) a plurality of reinforcing members loosely surrounding the buffer layer; and (4) an outer jacket. Optical fibers function to carry optical signals. A typical optical fiber includes an inner core surrounded by a cladding that is protected by a coating. The buffer layer functions to surround and protect the coated optical fibers. Reinforcing members add mechanical reinforcement to fiber optic cables to protect the internal optical fibers against stresses applied to the cables during installation and thereafter. Outer jackets also provide protection against chemical damage.

Drop cables used in fiber optic networks can be constructed having a jacket with a flat transverse profile. Such cables typically include a central buffer tube containing a plurality of optical fibers, and reinforcing members such as rods made of glass reinforced epoxy embedded in the jacket on opposite sides of the buffer tube. U.S. Pat. No. 6,542,674 discloses a drop cable of a type described above. Flat drop cables of the type described above are designed to be quite robust. However, as a result of such cables being strong and robust, such cables are typically quite stiff, inflexible and difficult to handle. Additionally, such cables can be expensive to manufacture.

SUMMARY

An aspect of the present disclosure relates to a fiber optic cable. The fiber optic cable includes an outer jacket defining a first passage and a second passage disposed adjacent to the first passage. The outer jacket includes a wall disposed between an outer surface of the outer jacket and the first passage. A plurality of optical fibers is disposed in the first passage. A reinforcing member is disposed in the second passage. An access member is disposed in the wall of the outer jacket.

Another aspect of the present disclosure relates to a fiber optic cable assembly. The fiber optic cable assembly includes an outer jacket defining a first passage and a second passage. The second passage is disposed adjacent to the first passage. The outer jacket includes a major axis that extends through a center of the outer jacket and a minor axis that extends through the center. The minor axis is generally perpendicular to the major axis. The outer jacket includes a first wall disposed between an outer surface of the outer jacket and the first passage and a second wall disposed between the outer surface of the outer jacket and the first passage. The first and second walls are disposed on opposite sides of the major axis. A plurality of optical fibers is disposed in the first passage. A reinforcing member is disposed in the second passage. A first access member is disposed in the first wall of the outer jacket. A second access member is disposed in the second wall of the outer jacket.

Another aspect of the present disclosure relates to a fiber optic cable assembly. The fiber optic cable assembly includes an outer jacket that defines a first passage and a second passage disposed adjacent to the first passage. The outer jacket includes a major axis that extends through a center of the outer jacket and a minor axis that extends through the center. The minor axis is generally perpendicular to the major axis. The outer jacket includes a wall disposed between an outer surface of the outer jacket and the first passage. A plurality of optical fibers is disposed in the first passage. A reinforcing member is disposed in the second passage. A first access member is disposed in the wall of the outer jacket. A second access member is disposed in the wall of the outer jacket. The first and second access members are disposed on the same side of the outer jacket as divided by the major axis.

Another aspect of the present disclosure relates to a method for accessing the optical fibers of the fiber optic cable assembly. The method includes applying a force to a portion of an outer jacket of a fiber optic cable assembly. The force is applied in a direction that is outward from a lengthwise axis of the fiber optic cable assembly. The force is of a magnitude that causes each of a first portion of a wall of the outer jacket disposed between an outer surface of the outer jacket and an access member and a second portion of the wall disposed between the access member and a first passage defined by the outer jacket to tear. The portion of the outer jacket is pulled until a desired length of the portion is separated from a remaining portion of the outer jacket. The optical fibers in the first passage of the outer jacket are accessed.

Another aspect of the present disclosure relates to a method for accessing the optical fibers of the fiber optic cable assembly. The method includes providing a fiber optic cable assembly having an outer jacket defining a passage. The passage contains an optical fiber. The outer jacket includes a wall having a first portion that extends from the passage to an access member and a second portion that extends from the access member to an outer surface of the outer jacket. The outer jacket is tensioned adjacent to the access member to tear the first and second portions without pulling on the access member.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
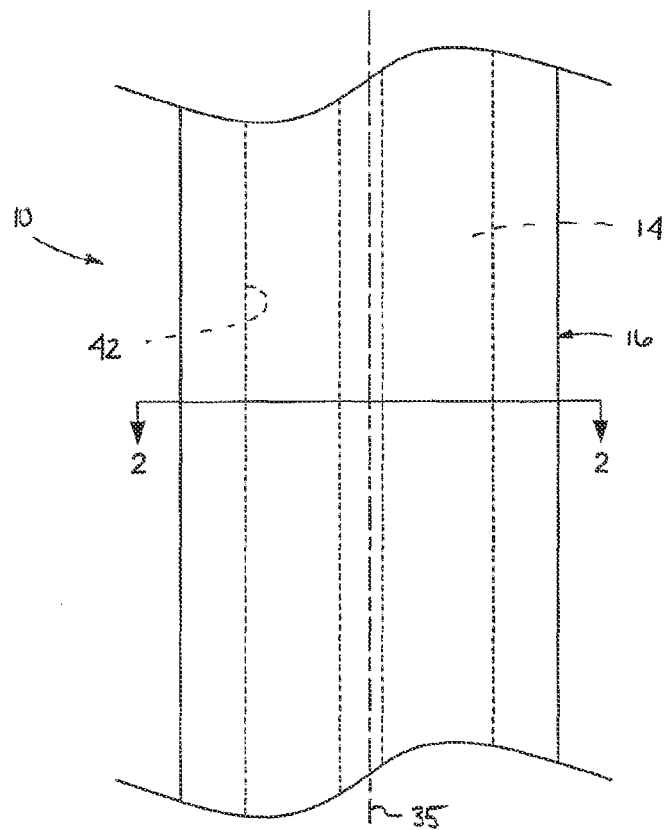
FIG. 1 is a front view of a fiber optic cable having exemplary features of aspects in accordance with the principles of the present disclosure.
Figure 2:
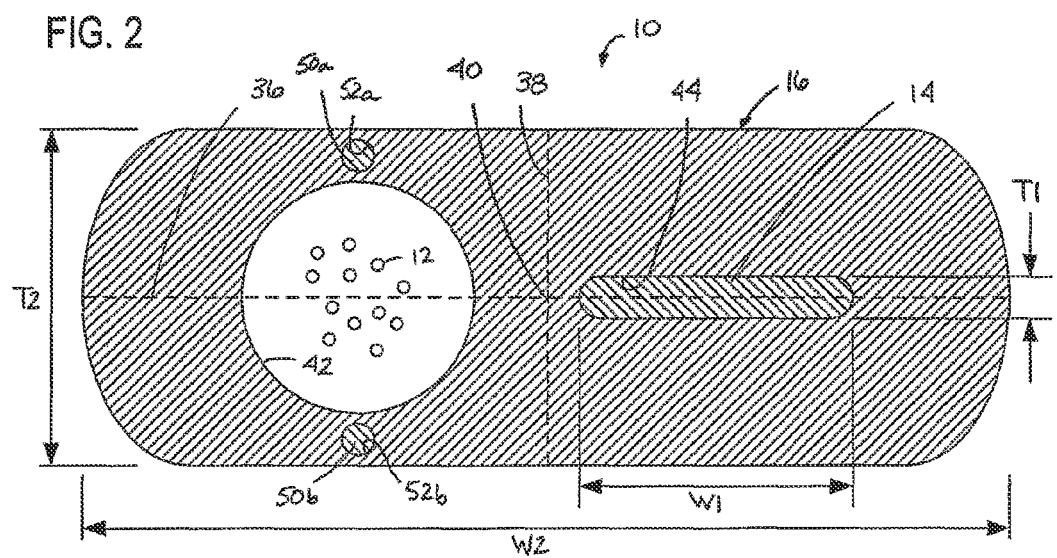
FIG. 2 is a cross-sectional view of the fiber optic cable taken on line 2-2 of FIG. 1.

Referring now to FIGS. 1 and 2, a fiber optic cable assembly 10 is shown. The fiber optic cable assembly 10 includes at least one optical fiber 12 and a reinforcing member 14. The fiber optic cable assembly 10 further includes an outer jacket 16 that surrounds the optical fiber 12 and the strength member 14.

In the depicted embodiment, the fiber optic cable assembly 10 includes a plurality of optical fibers 12. In one embodiment, the fiber optic cable assembly 10 includes twelve optical fibers 12. In another embodiment, the fiber optic cable assembly 10 includes 48, 72, or 144 optical fibers 12.

Figure 3:
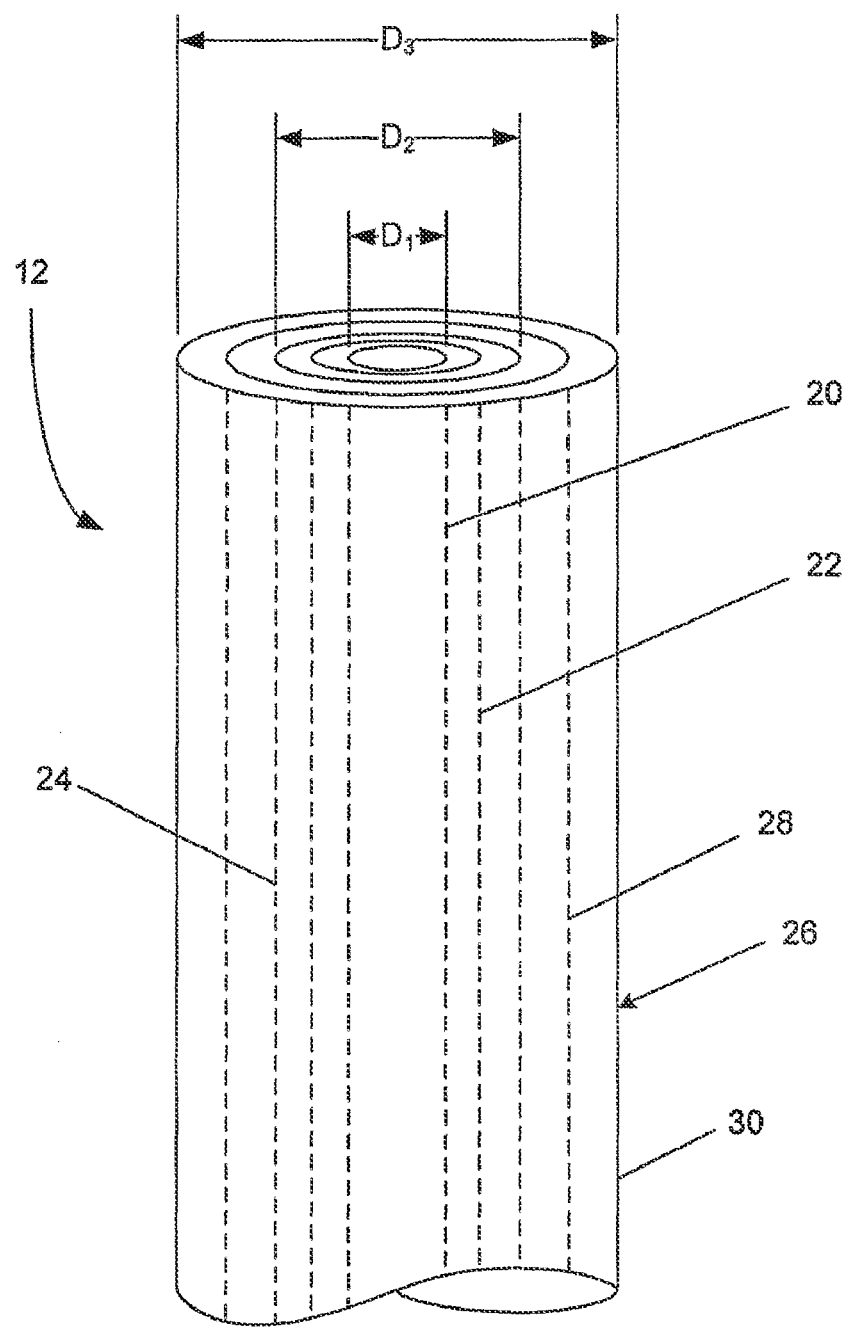
FIG. 3 is a perspective view of an optical fiber suitable for use with the fiber optic cable of FIG. 1.

Referring now to FIG. 3, the optical fiber 12 is shown. The optical fiber 12 can have any number of configurations. In the depicted embodiment of FIG. 3, the optical fiber 12 includes a core 20. The core 20 is made of a glass material, such as a silica-based material, having an index of refraction. In the subject embodiment, the core 20 has an outer diameter $D_1$ of less than or equal to about 10 μm.

The core 20 of each optical fiber 12 is surrounded by a first cladding layer 22 that is also made of a glass material, such as a silica based-material. The first cladding layer 22 has an index of refraction that is less than the index of refraction of the core 20. This difference between the index of refraction of the first cladding layer 22 and the index of refraction of the core 20 allows an optical signal that is transmitted through the optical fiber 12 to be confined to the core 20.

A second cladding layer 24 surrounds the first cladding layer 22. The second cladding layer 24 has an index of refraction. In the subject embodiment, the index of refraction of the second cladding layer 24 is about equal to the index of refraction of the first cladding layer 22. The second cladding layer 24 is immediately adjacent to the first cladding layer 22. In the subject embodiment, the second cladding layer 24 has an outer diameter $D_2$ of less than or equal to 125 μm.

A coating, generally designated 26, surrounds the second cladding layer 24. The coating 26 includes an inner layer 28 and an outer layer 30. In the subject embodiment, the inner layer 28 of the coating 26 is immediately adjacent to the second cladding layer 24 such that the inner layer 28 surrounds the second cladding layer 24. The inner layer 28 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 28 functions to protect the optical fiber 12 from microbending.

The outer layer 30 of the coating 26 is a polymeric material having a higher modulus of elasticity than the inner layer 28. In the subject embodiment, the outer layer 30 of the coating 26 is immediately adjacent to the inner layer 28 such that the outer layer 30 surrounds the inner layer 28. The higher modulus of elasticity of the outer layer 30 functions to mechanically protect and retain the shape of optical fiber 12 during handling. In the subject embodiment, the outer layer 30 defines an outer diameter $D_3$ of less than or equal to 300 μm. In another embodiment, the outer diameter $D_3$ of the outer layer 30 is less than or equal to 250 μm. In another embodiment, the outer diameter $D_3$ of the outer layer 30 is less than or equal to 200 μm.

In the subject embodiment, the optical fiber 12 is manufactured to reduce the sensitivity of the optical fiber 12 to micro or macro-bending (hereinafter referred to as "bend-insensitive"). An exemplary bend insensitive optical fiber has been described in U.S. Pat. Nos. 7,587,111 and 7,623,747 that are hereby incorporated by reference in their entirety. An exemplary bend-insensitive optical fiber is commercially available from Draka Comteq under the name BendBright XS.

Figure 4:
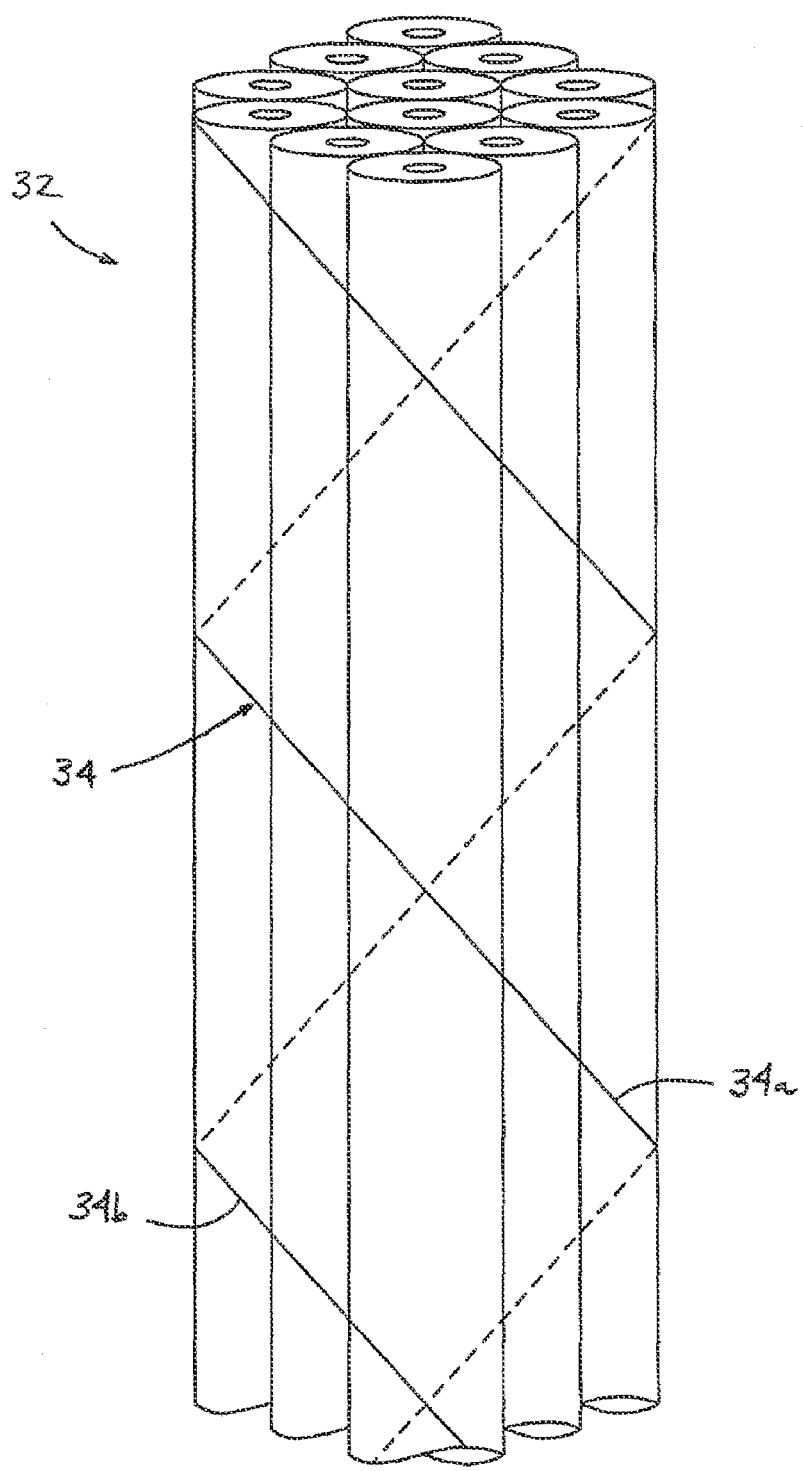
FIG. 4 is a perspective view of a fiber bundle suitable for use with the fiber optic cable of FIG. 1.

Referring now to FIG. 4, a fiber bundle 32 of optical fibers 12 is shown. While the optical fibers 12 can be loosely disposed in the fiber optic cable assembly 10, the plurality of optical fibers 12 can be bundled to form the fiber bundle 32. In the depicted embodiment of FIG. 4, the optical fibers 12 are contra-helically served.

The fiber bundle 32 includes fiber grouping members 34. The fiber grouping members 34 are adapted to group the optical fibers 12 in the fiber bundle 32. In the subject embodiment, the fiber grouping members 34 include a first fiber grouping member 34a and a second fiber grouping member 34b. The first and second fiber grouping members 34a, 34b are arranged immediately about the plurality of optical fibers 12 in a generally reverse double helical configuration along the length of the optical fibers 12. With the first and second fiber grouping members 34a, 34b disposed immediately about the plurality of optical fibers 12, there is no intermediate layer disposed between the first and second fiber grouping members 34a, 34b and the plurality of optical fibers 12.

In the reverse double helical configuration, the first fiber grouping member 34a spirals about the length of the optical fibers 12 in a first direction while the second fiber grouping member 34b spirals about the length of the optical fibers 12 in a second direction, which is opposite from the first direction. In the subject embodiment, the first direction is a clockwise direction and the second direction is a counterclockwise direction. This reverse double helical arrangement of the first and second fiber grouping members 34a, 34b about the plurality of optical fibers 12 groups and retains the plurality of optical fibers in the fiber bundle 32.

Referring now to FIG. 2, the reinforcing member 14 will be described. The reinforcing member 14 of the fiber optic cable assembly 10 is adapted to resist axial forces applied to the fiber optic cable assembly 10.

The reinforcing member 14 preferably has a transverse cross-sectional profile that is generally rectangular in shape. As shown at FIG. 2, the reinforcing member 14 has a transverse cross-sectional width W1 that is greater than a transverse cross-sectional thickness T1 of the reinforcing member 14. In certain embodiments, the width W1 of the reinforcing member 14 is at least 50% longer than the thickness T1, or the width W1 of the reinforcing member 14 is at least 75% longer than the thickness T1, or the width W1 of the reinforcing member 14 is at least 100% longer than the thickness T1, or the width W1 of the reinforcing member 14 is at least 200% longer than the thickness T1, or the width W1 of the reinforcing member 14 is at least 300% longer than the thickness T1, or the width W1 of the reinforcing member 14 is at least 400% longer than the thickness T1. As depicted in FIG. 2, the width W1 is a maximum width of the reinforcing member 14 and the thickness T1 is a maximum thickness of the reinforcing member 14.

The reinforcing member 14 preferably has a construction that is highly flexible and highly strong in tension. For example, in certain embodiments, the reinforcing member 14 provides the vast majority of the tensile load capacity of the fiber optic cable assembly 10. For example, in one embodiment, the reinforcing member 14 carries at least 95% of a 150 pound tensile load applied to the fiber optic cable assembly 10 in a direction along a lengthwise axis 35. In one embodiment, the reinforcing member 14 can carry a 150 pound tensile load applied in an orientation extending along a central longitudinal axis of the reinforcing member 14 without undergoing meaningful deterioration of the tensile properties of the reinforcing member 14. In another embodiment, the reinforcing member 14 can carry a 200 pound tensile load applied in an orientation extending along the central longitudinal axis of the reinforcing member 14 without undergoing meaningful deterioration in its tensile properties. In still another embodiment, the reinforcing member 14 can carry a 300 pound tensile load applied in an orientation that extends along the central longitudinal axis of the reinforcing member 14 without experiencing meaningful deterioration of its tensile properties.

In certain embodiments, the reinforcing member 14 is formed by a generally flat layer of reinforcing elements (e.g., fibers or yarns such as aramid fibers or yarns) embedded or otherwise integrated within a binder to form a flat reinforcing structure (e.g., a structure such as a sheet-like structure, a film-like structure, or a tape-like structure). In one example embodiment, the binder is a polymeric material such ethylene acetate acrylite (e.g., UV-cured, etc.), silicon (e.g., RTV, etc.), polyester films (e.g., biaxially oriented polyethylene terephthalate polyester film, etc.), and polyisobutylene. In other example instances, the binder may be a matrix material, an adhesive material, a finish material, or another type of material that binds, couples or otherwise mechanically links together reinforcing elements.

In other embodiments, the reinforcing member 14 can have a glass reinforced polymer (GRP) construction. The glass reinforced polymer can include a polymer base material reinforced by a plurality of glass fibers such as E-glass, S-glass or other types of glass fiber. The polymer used in the glass reinforced polymer is preferably relatively soft and flexible after curing. For example, in one embodiment, the polymer has a Shore A hardness less than 50 after curing. In other embodiments, the polymer has a Shore A hardness less than 46 after curing. In certain other embodiments, the polymer has a Shore A hardness in the range of about 34-46.

In one embodiment, the reinforcing member 14 can have a width of about 0.085 inches and a thickness of about 0.045 inches. In another embodiment, such a reinforcing member 14 may have a width of about 0.125 inches and a thickness of about 0.030 inches. In still further embodiments, the reinforcing member 14 has a thickness in the range of 0.020-0.040 inches, or in the range of 0.010-0.040 inches, or in the range of 0.025-0.035 inches. Of course, other dimensions could be used as well. In additional embodiments, the reinforcing member 14 may have a width in the range of 0.070-0.150 inches. Of course, other sizes could be used as well.

In certain embodiments, the reinforcing member 14 preferably does not provide the fiber optic cable assembly 10 with meaningful resistance to compression loading in an orientation extending along the lengthwise axis 35. For example, in certain embodiments, the outer jacket 16 provides greater resistance to compression than the reinforcing member 14 in an orientation extending along the lengthwise axis 35.

Referring now to FIGS. 1 and 2, the outer jacket 16 of the fiber optic cable assembly 10 will be described. In the depicted embodiment, the outer jacket 16 has a non-circular outer profile. For example, as shown at FIG. 2, when viewed in transverse cross-section, the outer profile of the outer jacket 16 has a flat generally obround or rectangular shape.

The outer jacket 16 includes a major axis 36 and a minor axis 38. The major and minor axes 36, 38 are perpendicular to one another and intersect at a center 40 of the outer jacket 16. A width W2 of the outer jacket 16 extends along the major axis 36 and a thickness T2 of the outer jacket 16 extends along the minor axis 38. The width W2 is longer than the thickness T2. In certain embodiments, the width W2 is at least 50% longer than the thickness T2. As depicted in FIG. 1, the width W2 is a maximum width of the outer jacket 16 and the thickness T2 is a maximum thickness of the outer jacket 16.

The outer jacket 16 includes a base material that is a thermoplastic material. In one embodiment, the base material is a low-smoke zero halogen material such as low-smoke zero halogen polyolefin and polycarbonate. In another embodiment, the base material of the outer jacket 16 is a conventional thermoplastic material such as polyethylene, polypropylene, ethylene-propylene, copolymers, polystyrene and styrene copolymers, polyvinyl chloride, polyamide (nylon), polyesters such as polyethylene terephthalate, polyetheretherketone, polyphenylene sulfide, polyetherimide, polybutylene terephthalate, as well as other thermoplastic materials.

In one embodiment, the outer jacket 16 includes a plurality of shrinkage reduction material disposed in the base material. The shrinkage reduction material in the base material of the outer jacket 16 is adapted to resist post-extrusion shrinkage. U.S. Pat. No. 7,379,642 describes an exemplary use of shrinkage reduction material in the base material of the outer jacket and is hereby incorporated by reference in its entirety.

In one embodiment, the shrinkage reduction material is liquid crystal polymer (LCP). Examples of liquid crystal polymers suitable for use in the multi-fiber cable assembly 10 are described in U.S. Pat. Nos. 3,991,014; 4,067,852; 4,083,829; 4,130,545; 4,161,470; 4,318,842; and 4,468,364 and are hereby incorporated by reference in their entireties.

In order to promote flexibility in the fiber optic cable assembly 10, the concentration of shrinkage reduction material is relatively small as compared to the base material. In one embodiment, and by way of example only, the shrinkage reduction material constitutes less than about 10% of the total weight of the outer jacket 16. In another embodiment, and by way of example only, the shrinkage reduction material constitutes less than about 5% of the total weight of the outer jacket 16. In another embodiment, the shrinkage reduction material constitutes less than about 2% of the total weight of the outer jacket 16. In another embodiment, the shrinkage reduction material constitutes less than about 1.9%, less than about 1.8%, less than about 1.7%, less than about 1.6%, less than about 1.5%, less than about 1.4%, less than about 1.3%, less than about 1.2%, less than about 1.1%, or less than about 1% of the total weight of the outer jacket 16.

The outer jacket 16 defines a first passage 42 and a second passage 44. In the depicted embodiment of FIG. 2, the first passage 42 has a generally circular profile. The first passage 42 defines a center that is offset from the center 40 of the outer jacket 16.

The first passage 42 is adapted to receive the plurality of optical fibers 12. The plurality of optical fibers 12 is disposed directly in the first passage 42 so that there is no intermediate layer (e.g., buffer tube, strength layer, etc.) disposed between the plurality of optical fibers 12 and the outer jacket 16. The first passage 42 extends the length of the fiber optic cable assembly 10.

The second passage 44 is adapted to receive the reinforcing member 14. In the depicted embodiment, the second passage 44 has a non-circular profile. For example, as shown at FIG. 1, when viewed in transverse cross-section, the second passage 44 has a generally obround or rectangular shape.

In one embodiment, the reinforcing member 14 is bonded to the second passage 44 of the outer jacket 16. The bonding between the reinforcing member 14 and the outer jacket 16 can be chemical bonding or thermal bonding. In one embodiment, the reinforcing member 14 may be coated with or otherwise provided with a material having bonding characteristics (e.g., ethylene acetate) to bond the reinforcing member 14 to the outer jacket 16.

The second passage 44 is disposed adjacent to the first passage 42. In the depicted embodiment, the second passage 44 is offset from the center 40 of the outer jacket 16. The second passage 44 is disposed in the outer jacket 16 so that the width W1 of the reinforcing member 14 is disposed along the major axis 36 of the outer jacket 16.

Figure 5:
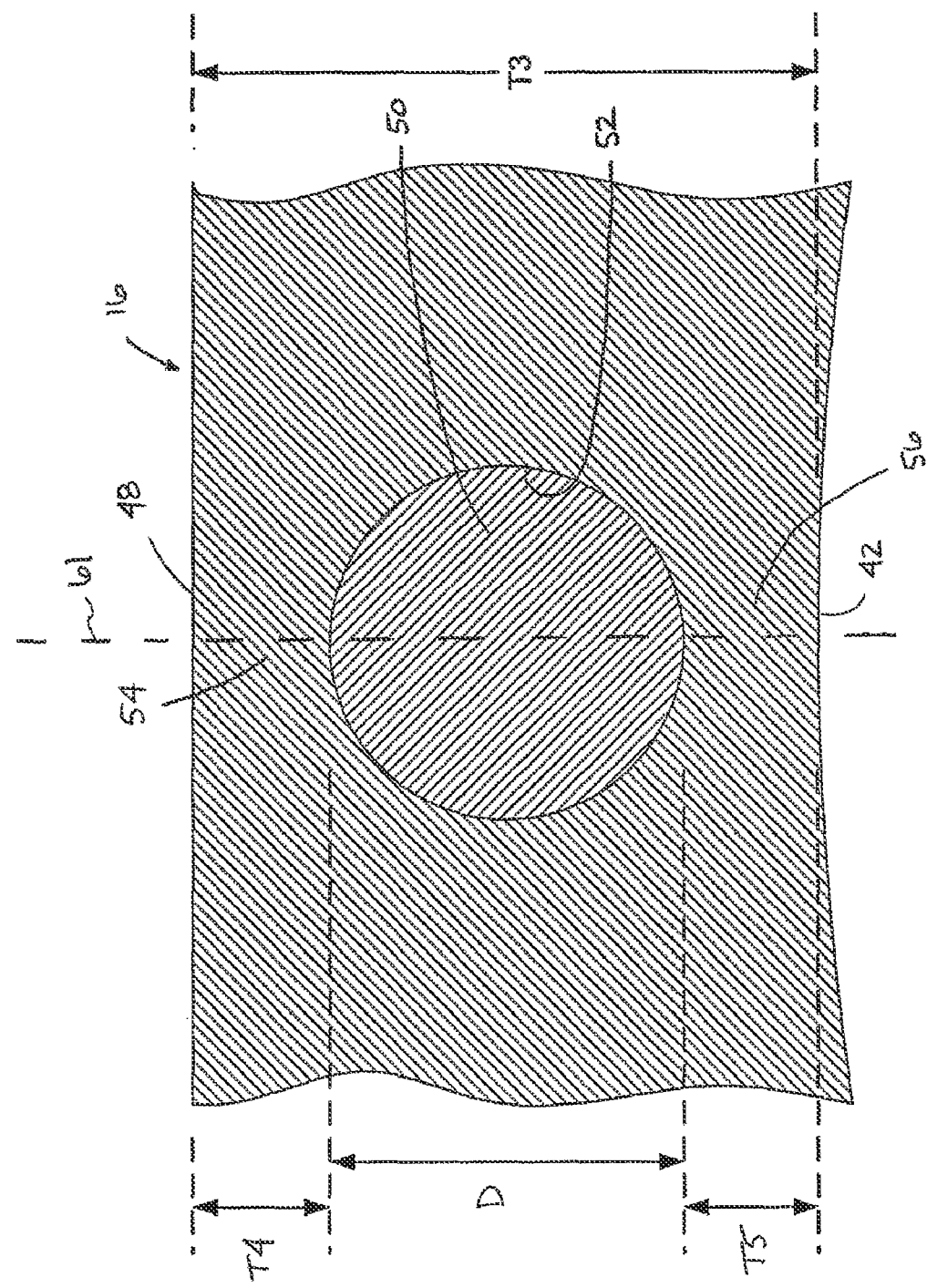
FIG. 5 is a fragmentary view of an outer jacket of the fiber optic cable of FIG. 1.

Referring now to FIGS. 2 and 5, the fiber optic cable assembly 10 includes a wall 46 disposed between an outer surface 48 of the outer jacket 16 and an inner diameter of the first passage 42. The outer jacket 16 forms the wall 46. The wall 46 includes a thickness T3. In the depicted embodiment, the outer surface 48 of the wall 46 is continuous. It will be understood that the term "continuous" means that there are no indentations or lines of weakness in the outer surface 48 of the outer jacket 16.

The fiber optic cable assembly 10 further includes at least one access member 50 disposed in the wall 46 of the outer jacket 16. In one embodiment, the access member 50 is a monofilament having a generally circular cross-section. In one embodiment, the access member 50 is made of a material having a melting point temperature that is greater than the melting point temperature of the material of the outer jacket 16.

The access member 50 includes an outer diameter D. In one embodiment, the outer diameter D of the access member 50 is at least 30% of the thickness T3 of the wall 46. In another embodiment, the outer diameter D of the access member 50 is at least 40% of the thickness T3 of the wall 46.

The outer jacket 16 defines an access member passage 52 that extends the length of the fiber optic cable assembly 10. The access member passage 52 of the outer jacket 16 has an inner diameter that is generally equal to the outer diameter D of the access member 50.

Referring now to FIG. 5, the outer jacket 16 includes a first portion 54 of the wall 46 and a second portion 56. The first portion 54 of the wall 46 extends between the outer surface 48 of the outer jacket 16 and the inner diameter of the access member passage 52. The first portion 54 of the wall 46 has a thickness T4.

The second portion 56 of the wall 46 extends between the inner diameter of the first passage 42 and the inner diameter of the access member passage 52. The second portion 56 of the wall 46 has a thickness T5. In the depicted embodiment, the second portion 56 of the wall 46 is oppositely disposed from the first portion 54 of the wall 46.

The thickness T4 of the first portion 54, the thickness T5 of the second portion 56 and the outer diameter D of the access member 50 cooperatively make up the thickness T3 of the wall 46. In the depicted embodiment, the thickness T4 of the first portion 54 is generally equal to the thickness T5 of the second portion 56. In one embodiment, the thickness T4 of the first portion 54 is at most 0.010 inches. In another embodiment, the thickness T4 of the first portion 54 of the wall 46 is at most 0.0075 inches. In another embodiment, the thickness T4 of the first portion 54 of the wall 46 is at most 0.005 inches. In one embodiment, the thickness T5 of the second portion 56 is at most 0.010 inches. In another embodiment, the thickness T5 of the second portion 56 of the wall 46 is at most 0.0075 inches. In another embodiment, the thickness T5 of the second portion 56 of the wall 46 is at most 0.005 inches. In the depicted embodiment, the thickness T4 of the first portion 54 is generally equal to the thickness T5 of the second portion 56.

In the depicted embodiment of FIG. 2, the fiber optic cable assembly 10 includes a first access member 50a and a second access member 50b. The first and second access members 50a, 50b are disposed on opposite sides of the first passage 42 so that each of the first and second access members 50a, 50b are disposed on an axis 58 that extends through a center of the first passage 42 where the axis 58 is generally perpendicular to the major axis 36 of the fiber optic cable assembly 10. In the depicted embodiment, the first and second access members 50a, 50b are disposed on opposite sides of the fiber optic cable assembly 10 as divided by the major axis 36 but on the same side of the fiber optic cable assembly 10 as divided by the minor axis 38.

Figure 6:
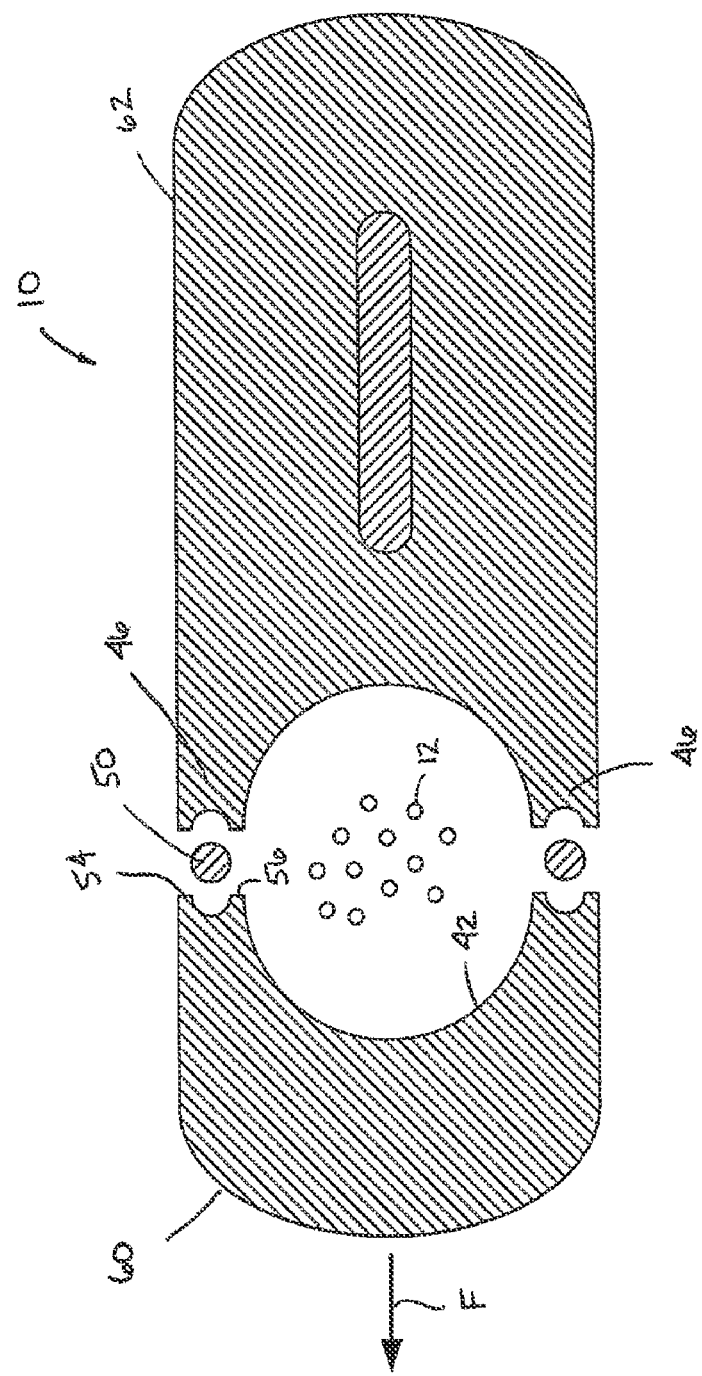
FIG. 6 is a cross-sectional view of the fiber optic cable showing a portion of the fiber optic cable separated from a remaining portion.
Figure 7:
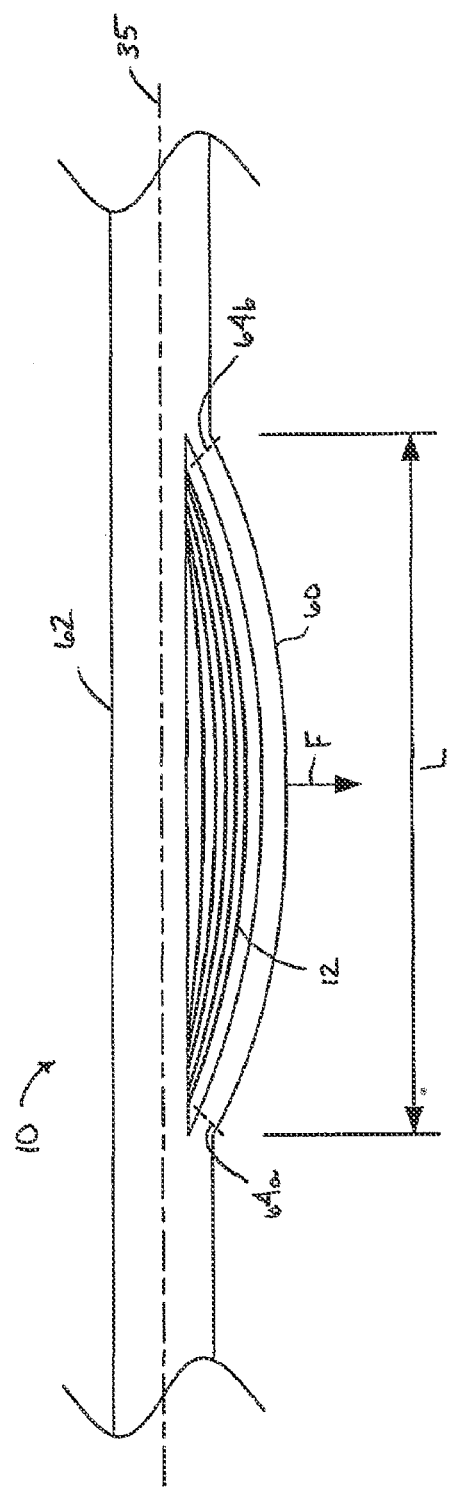
FIG. 7 is a side view of the fiber optic cable of FIG. 6.

Referring now to FIGS. 5, 6 and 7, a method for accessing the optical fibers 12 of the fiber optic cable assembly 10 will be described. A force F is applied to a portion 60 of the outer jacket 16. The portion 60 extends between the first and second access members 50a, 50b. In the subject embodiment, the portion 60 is on the opposite side of the minor axis 38 of the fiber optic cable assembly 10 from the reinforcing member 14. In the depicted embodiment, the portion 60 is less than or equal to half of the cross-sectional profile of the fiber optic cable assembly 10. In another embodiment, the portion 60 is less than or equal to a third of the cross-sectional profile of the fiber optic cable assembly 10. The force F is applied to the portion 60 so that the force F extends outwardly from the lengthwise axis 35 of the fiber optic cable assembly 10. In the depicted embodiment of FIG. 7, the force F is generally perpendicular to the lengthwise axis 35. In the subject embodiment, the force F extends outwardly from the portion 60 in a first direction along the major axis 36 of the fiber optic cable assembly 10. The force F can be applied with a tool such as pliers.

In the depicted embodiment of FIG. 7, the force F is generally perpendicular to an access line 61. The access line 61 passes through the first and second portions 54, 56 of the outer jacket 16 and the access member 50. In the subject embodiment, the access line 61 passes through the center of the access member 50.

In one embodiment, the portion 60 is pulled in the first direction while a remaining portion 62 of the outer jacket 16 is held stationary. In another embodiment, the portion 60 is pulled in a first direction while the remaining portion 62 is pulled in a second direction that is opposite the first direction.

The force F applied to the portion 60 of the fiber optic cable assembly 10 is of a magnitude that causes the first and second portions 54, 56 of the wall 46 to tear. The force F is applied until a desired length L of the portion 60 has been broken away from the remaining portion 62 of the fiber optic cable assembly 10. The access members 50 disposed in the wall 46 provide a discontinuity in the wall 46. Unlike a ripcord, a force is not applied to the access members 50 to create a break or tear in the wall. The force F is only applied to the outer jacket 16.

With the portion 60 removed from the fiber optic cable assembly 10, the optical fibers 12 in the first passage 42 are accessible so that the optical fibers 12 can be spliced or so that a fiber optic breakout can be installed. In one embodiment, the portion 60 of the fiber optic cable assembly 10 that has been broken away from the fiber optic cable assembly 10 is cut at opposite ends 64a, 64b of the portion 60 where the portion 60 is still engaged or connected to the fiber optic cable assembly 10.

Figure 8:
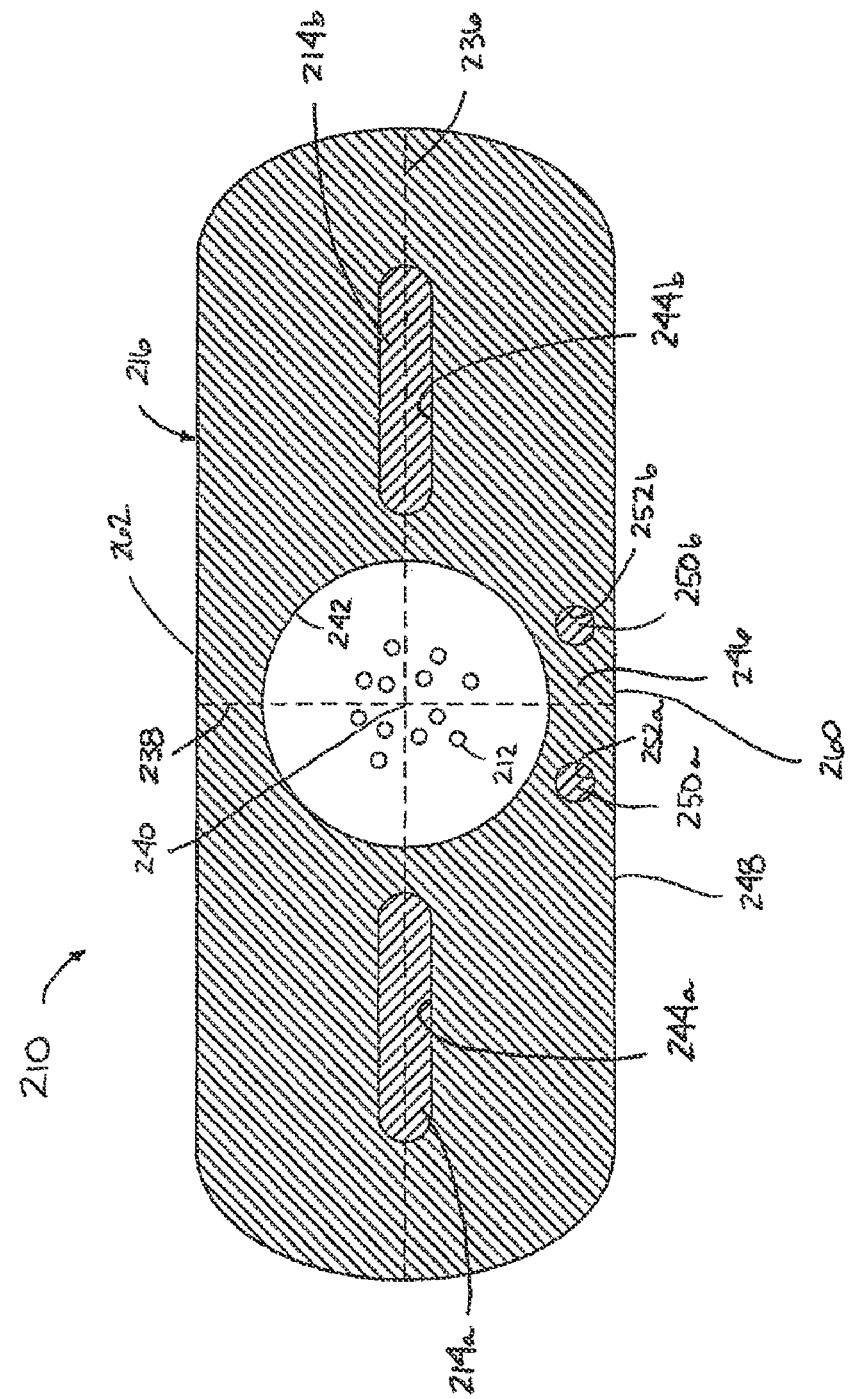
FIG. 8 is a cross-sectional view of an alternate embodiment of a fiber optic cable.
Figure 9:
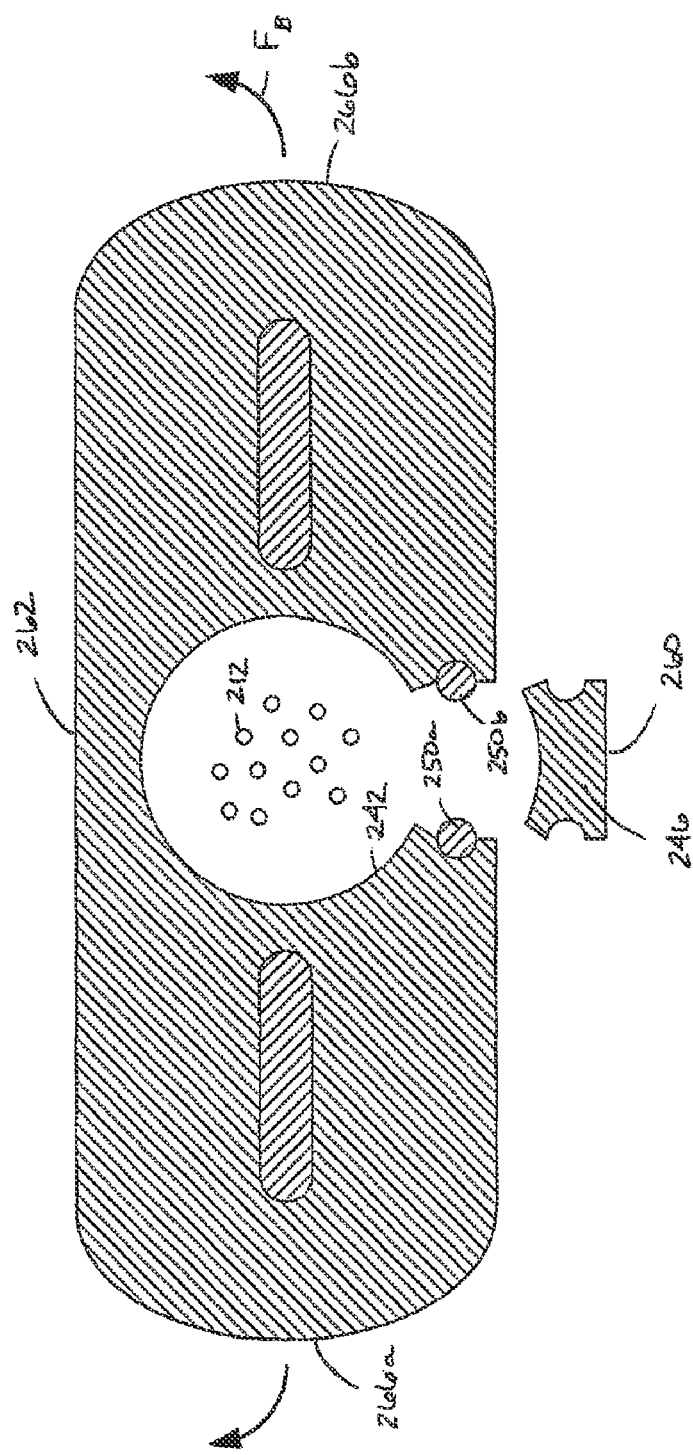
FIG. 9 is a cross-sectional view of the fiber optic cable of FIG. 8 with a portion of the fiber optic cable separated from a remaining portion.

Referring now to FIGS. 8 and 9, an alternate embodiment of a fiber optic cable assembly 210 is shown. The fiber optic cable assembly 210 includes a plurality of optical fibers 212, a first reinforcing member 214a and a second reinforcing member 214b and an outer jacket 216.

In the depicted embodiment, each of the first and second reinforcing members 214a, 214b has a transverse cross-sectional profile that is generally rectangular in shape. As shown at FIG. 8, the first and second reinforcing members 214a, 214b have a transverse cross-sectional width that is greater than a transverse cross-sectional thickness.

The fiber optic cable assembly 210 includes a central longitudinal axis. In the depicted embodiment, the outer jacket 216 has a non-circular outer profile. For example, as shown at FIG. 8, when viewed in transverse cross-section, the outer profile of the outer jacket 216 has a flat generally obround or rectangular shape. The outer jacket 216 includes a major axis 236 and a minor axis 238. The major and minor axes 236, 238 are perpendicular to one another and intersect at a center 240 of the outer jacket 216. A width of the outer jacket 216 extends along the major axis 236 and a thickness of the outer jacket 216 extends along the minor axis 238. The width of the outer jacket 216 is longer than the thickness.

The outer jacket 216 of the fiber optic cable assembly 210 defines a fiber passage 242 that extends along the central longitudinal axis. In the depicted embodiment, the fiber passage 242 is disposed at the center 240 of the fiber optic cable assembly 210. The outer jacket 216 further defines second and third passages 244a, 244b. The second passage 244a is adapted to receive the first reinforcing member 214a while the third passage 244b is adapted to receive the second reinforcing member 214b.

The second and third passages 244a, 244b are generally aligned with the major axis 236. The second and third passages 244a, 244b are disposed on opposite sides of the minor axis 238.

The fiber optic cable assembly 210 includes a wall 246 disposed between an outer surface 248 of the outer jacket 216 and an inner diameter of the fiber passage 242. The outer jacket 216 forms the wall 246.

The fiber optic cable assembly 210 further includes a first access member 250a and a second access member 250b. The first and second access members 250a, 250b are embedded in the outer jacket 216. In the depicted embodiment, the first and second access members 250a, 250b are disposed in first and second access member passages 252a, 252b defined by the wall 246. In the depicted embodiment, the first and second access member passages 252a, 252b are disposed on the same side of the fiber optic cable assembly 210 as divided by the major axis 236 but on opposite sides of the fiber optic cable assembly 210 as divided by the minor axis 238.

Referring now to FIG. 9, a method for accessing the optical fibers 212 of the fiber optic cable assembly 210 will be described. A bending force $F_B$ is applied to the outer jacket 216 of the fiber optic cable assembly 210. The bending force $F_B$ is applied to the fiber optic cable assembly 210 so that a first portion 260 of the outer jacket 216 is under tension while a second portion 262 is under compression. In the depicted embodiment, the first portion 260 extends between the first and second access members 250a, 250b. In the subject embodiment, the first portion 260 is disposed between the first and second reinforcing members 214a, 214b.

In the depicted embodiment, the bending force $F_B$ is applied to first and second sides 266a, 266b of the fiber optic cable assembly 210 so that the first portion 260 is under tension while the second portion 262 is under compression. The bending force $F_B$ applied to the fiber optic cable assembly 210 causes the wall 246 to tear. The bending force $F_B$ is applied until a desired length of the first portion 260 has been broken away from the fiber optic cable assembly 210. With the first portion 260 separated from the fiber optic cable assembly 210, the optical fibers 212 in the fiber passage 242 are accessible so that the optical fibers 212 can be spliced or so that a fiber optic breakout can be installed.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A fiber optic cable assembly comprising:
    an outer jacket defining a first passage and a second passage disposed adjacent to the first passage, the outer jacket including a wall disposed between an outer surface of the outer jacket and the first passage;
    a plurality of optical fibers disposed in the first passage;
    a reinforcing member disposed in the second passage; and
    an access member disposed in the wall of the outer jacket;
    wherein the wall includes a first portion that extends between the first passage and the access member and a second portion that extends between an outer surface of the outer jacket and the access member, the first portion having a first thickness, the second portion having a second thickness, the first and second thicknesses being about equal.

2. The fiber optic cable assembly of claim 1, wherein the outer jacket includes a major axis that extends through a center of the fiber optic cable and a minor axis that extends through the center, the minor axis being generally perpendicular to the major axis.

3. The fiber optic cable assembly of claim 2, wherein the outer jacket has a width that extends along the major axis and a thickness that extends along the minor axis, the width being greater than the thickness.

4. The fiber optic cable assembly of claim 1, wherein the outer surface of the outer jacket is continuous.

5. The fiber optic cable assembly of claim 1, wherein the first thickness of the first portion of the wall is at most about 0.010 inches.

6. The fiber optic cable assembly of claim 1, wherein the optical fibers are loosely disposed in the first passage.

7. The fiber optic cable assembly of claim 1, wherein the optical fibers are disposed in a fiber bundle, the fiber bundle being disposed in the first passage.

8. The fiber optic cable assembly of claim 7, wherein the optical fibers are contra-helically served.

9. The fiber optic cable assembly of claim 1, wherein the reinforcing member has a cross-sectional width that is greater than a cross-sectional thickness so that the reinforcing member has a cross-sectional profile that is generally rectangular in shape.

10. A fiber optic cable assembly comprising:
    an outer jacket defining a first passage and a second passage disposed adjacent to the first passage, the outer jacket including a major axis that extends through a center of the outer jacket and a minor axis that extends through the center, the minor axis being generally perpendicular to the major axis, the outer jacket including a first wall disposed between an outer surface of the outer jacket and the first passage and a second wall disposed between an outer surface of the outer jacket and the first passage, wherein the first and second walls are disposed on opposite sides of the major axis;

a plurality of optical fibers disposed in the first passage;
a reinforcing member disposed in the second passage;
a first access member disposed in the first wall of the outer jacket; and
a second access member disposed in the second wall of the outer jacket.

11. The fiber optic cable assembly of claim 10, wherein the outer jacket has a width that extends along the major axis and a thickness that extends along the minor axis, the width being greater than the thickness.

12. The fiber optic cable assembly of claim 10, wherein the first wall includes a first portion that extends between the first passage and the first access member and a second portion that extends between an outer surface of the outer jacket and the first access member, the first portion having a first thickness, the second portion having a second thickness, the first and second thicknesses being about equal.

13. The fiber optic cable assembly of claim 12, wherein the first thickness of the first portion of the first wall is at most about 0.010 inches.

14. The fiber optic cable assembly of claim 12, wherein the second wall includes a first portion that extends between the first passage and the second access member and a second portion that extends between an outer surface of the outer jacket and the second access member, the first portion having a first thickness, the second portion having a second thickness, the first and second thicknesses being about equal.

15. The fiber optic cable assembly of claim 14, wherein the first thickness of the first portion of the second wall is at most about 0.010 inches.

16. The fiber optic cable assembly of claim 10, wherein the optical fibers are loosely disposed in the first passage.

17. A fiber optic cable assembly comprising:
an outer jacket defining a first passage and a second passage disposed adjacent to the first passage, the outer jacket including a major axis that extends through a center of the outer jacket and a minor axis that extends through the center, the minor axis being generally perpendicular to the major axis, the outer jacket including a wall disposed between an outer surface of the outer jacket and the first passage;
a plurality of optical fibers disposed in the first passage;
a reinforcing member disposed in the second passage;
a first access member disposed in the wall of the outer jacket; and
a second access member disposed in the wall of the outer jacket, wherein the first and second access members are disposed on the same side of outer jacket as divided by the major axis.

18. The fiber optic cable assembly of claim 15, wherein the optical fibers are loosely disposed in the first passage.

19. A method for accessing the optical fibers of a fiber optic cable assembly, the method comprising:
applying a force to a portion of an outer jacket of a fiber optic cable assembly, the force being applied in a direction that is outward from a lengthwise axis of the fiber optic cable assembly, the force being of a magnitude so that each of a first portion of a wall of the outer jacket disposed between an outer surface of the outer jacket and an access member disposed in the wall and a second portion of the wall disposed between the access member and a first passage defined by the outer jacket tears;
pulling the portion of the outer jacket so that a desired length of the portion is separated from a remaining portion of the outer jacket; and
accessing the optical fibers in the first passage of the outer jacket.

20. A method for accessing the optical fibers of a fiber optic cable assembly, the method comprising:
providing a fiber optic cable assembly having an outer jacket defining a passage containing an optical fiber, the outer jacket including a wall having a first portion that extends from the passage to an access member and a second portion that extends from the access member to an outer surface of the outer jacket; and
tensioning the outer jacket adjacent to the access member to tear the first and second portions without pulling on the access member.

* * * * *